Sept. 10, 1968  D. J. HOLE  3,400,491

DOOR LOCKING MECHANISM

Filed July 5, 1966

INVENTOR
DAVID J. HOLE

BY
*Roy E. Rainey* ATTORNEY

United States Patent Office 3,400,491
Patented Sept. 10, 1968

3,400,491
DOOR LOCKING MECHANISM
David J. Hole, 10464 Hettrick Circle W.,
Largo, Fla. 33540
Filed July 5, 1966, Ser. No. 562,889
20 Claims. (Cl. 49—394)

ABSTRACT OF THE DISCLOSURE

An improved door structure suitable for automobiles is shown in which the automobile door is locked in its closed position by a bolt projecting from its swinging edge, the outer end of which bolt has laterally projecting shoulders which are received between spaced abutments of a locking member on the door frame, the bolt and locking member being rotatable about the axis of the bolt, when the door is closed, so that the shoulders on the bolt may be moved to and from a position between the spaced abutments of the rotatable member to permit opening and closing movements of the door and which bolt and element are rotated when the door is closed whereby the abutments and shoulders then extend in a direction normal to the movement of the door and the shoulders are brought into alignment with additional abutments on the door frame between the door and rotatable member whereby the shoulders of the bolt are blocked to prevent opening movement of the door as well as separation of the door from the door frame in a direction longitudinally of the bolt, the bolt being supported for axial movement in a limited direction from the door by a guide frame which extends across the door and has the end remote from the bolt anchored to the side of the doorway, the guide frame and bolt serving to tie the door between the two opposite sides of the doorway frame.

---

The present invention relates to locking mechanisms for doors, and more particularly to locking mechanisms for automobile doors.

One hazard encountered in collisions of automobiles is the tendency of the doors to fly open permitting occupants of the vehicle to be thrown onto the ground where they are apt to be subjected to severe injury or death. The doors open as a result of the door frame members of the automobile body buckling or bending under the shocks and strains imposed by the collision, causing separation of the catch on the door frame from the latching bolt on the door.

A principal object of the present invention is the provision of a new and improved door latching mechanism in which the latching bolt is secured to the catch on the door frame so that it cannot become readily separated therefrom except by operation of the door opening handle, and which bolt is yieldingly extendable from the door so that it provides a substantial connecting link between the door and the door frame although relatively wide separation of the door and the adjacent frame member may occur forcefully.

Another object of the invention is the provision of a door latching mechanism of the character mentioned comprising an elongated door locking bolt structure extending from one side of the door to the other and including an end member pivotally attached to the vertical door frame member at the hinged side of the door, and a bolt member at the other end of the locking structure engageable with a catch on the frame at the opposite side of the door, the catch and bolt having abutment means engaging in planes extending parallel to the plane of the door and extending transversely of the door so that the bolt is substantially surrounded by catch abutment means, and means to provide yielding extension of said bolt from said door while maintaining tensile connection with the end member of the bolt structure.

A further object of the invention is the provision of a new and improved door latching mechanism comprising a shaft-like bolt extending from one side edge of the door and having a laterally projecting shoulder member thereon, a catch on the frame for the door to receive the shoulder member of the bolt, the catch having an aperture to receive the extended bolt and shoulder member when the door is moved to bring the one side edge adjacent the door frame, the catch and bolt having relative rotation whereby the shoulder member is enclosed by abutments arranged to resist withdrawal of the bolt from the catch, and means for effecting relative rotation of the bolt and catch shoulder means to release the bolt from the catch.

Other objects and advantages of the invention will be apparent from the following description of a preferred form thereof, reference being made to the accompanying drawings wherein.

Figure 1:
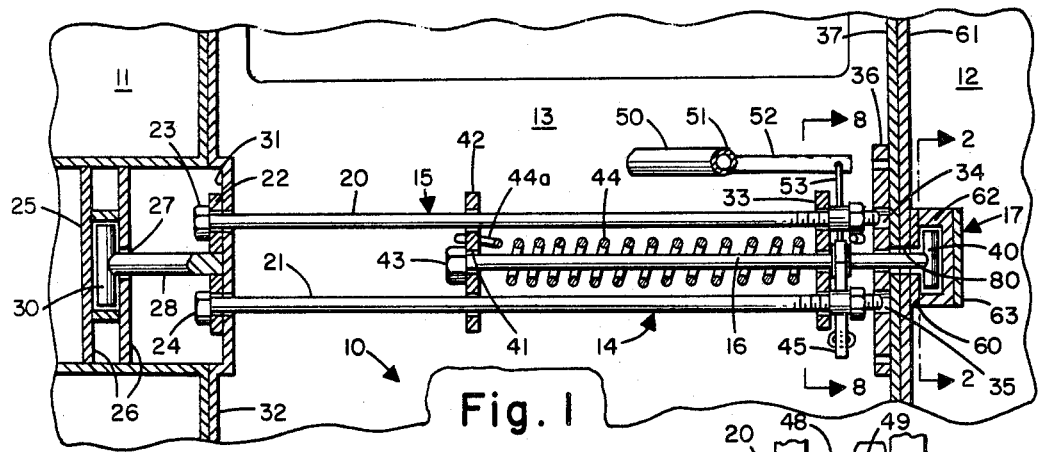
FIG. 1 is a fragmentary view of a door and door frame of an automobile body having a door latching mechanism embodying the invention.
Figure 4:
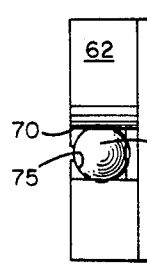
FIG. 4 is an end elevational view of the mechanism shown in FIG. 2.

Referring to the drawings, a door structure 10 is shown which comprises a part of the passenger compartment of an automobile and includes two vertical upright door frame members 11, 12 and a door 13 movable on hinges, not shown, into and out of alignment with the door frame members to close and open the doorway in a conventional manner. The door 13 is latched in the doorway closing position by a latching mechanism 14 which is constructed according to the present invention.

The latching mechanism 14 comprises a bolt structure 15 which is attached to the interior of the door 13 and has a bolt 16 which extends from one edge of the door into a catch 17 attached to the frame member 12. The bolt 16 is supported for yielding longitudinal movement by a frame comprised of two spaced parallel extending rods 20, 21 one end of each of which rods extends loosely through one of two spaced openings in an anchor plate 22 and having holding nuts 23, 24 threaded on the ends to prevent removal of the ends of the rods from the anchor plate. The plate 22 is pivotally anchored to the door frame 11 in a socket 25 which is welded to internal bracing 26 of the door frame member 11 and which has a vertical axis aligned with the axes of the door hinges, not shown. The side wall of the socket 25 has an arcuate slot 27 through which a connector rod 28 extends. The rod 28 is secured at one end to plate 22 and the opposite end is integral with a pivotal rod section 30 which is rotatably supported in the socket 25 so that the socket and rod section 30 anchor the left hand end of the bolt structure 14 to the door frame 11 while permitting free swinging of the door 13 about its hinges. The rod section 30 obviously performs the function of a hinge for the door in addition to forming an anchor for the bolt structure.

The plate 22 is located in a depression 31 formed in the side edge wall 32 of the door 13, and the rods 20, 21 extend through openings through the door wall 32.

In addition to the anchorage provided by the pivoted section 30, the wall 32 provides resistance to tensile forces exerted along the rods 20, 21.

The right hand ends of the rods 20, 21 are retained separated by a spacer bar 33 which has three spaced openings through which the bolt 16 and rods 20, 21 extend. The extremities of the rods 20, 21 nest is openings 34, 35 formed in a plate 36 suitably secured to the inside of a side edge wall 37 of the door 13.

The bolt rod 16 has a T-shaped outer end or lock head 40 formed by a cross rod which is welded to the end of the bolt rod at right angles thereto. The inner end of the bolt 16 is supported in a central opening 41 of a spacer bar 42 having upper and lower openings through which the rods 20, 21 extend. A nut 43 is threaded on the end of the bolt 16 extending through the opening 41 and forms a stop for preventing withdrawal of the bolt through the opening. A compression spring 44 encircles the bolt 16 and its opposite ends bear against plates 33 and 42 and resists any tendency of the bolt to be drawn outwardly. The plate 33 is positioned on the rods 20, 21 by tubular spacers 48 on the rods and between the plate and nuts 49 threaded on the rods.

Figure 8:
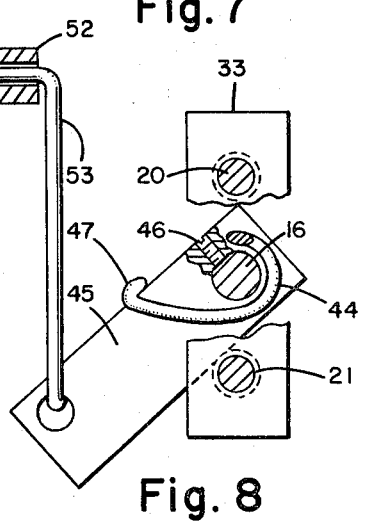
FIG. 8 is a sectional view take substantially along line 8—8 of FIG. 1.

The bolt 16 is adapted to be rotated about its axis by an operating arm 45 having an opening therethrough and being keyed to the bolt by a set screw 46. The bolt 16 is urged counterclockwise, as viewed in FIG. 8, by the spring 44 which has one end 44a braced against the spacer bar 42 and the other end 47 engaging an edge of the operating arm 45. The spring 44 is twisted to provide a torque action tending to move to arm 45 against the rod 21 at which position the lock head 40 extends along a vertical axis. The bolt 16 can be rotated clockwise 90° as limited by engaging one or the other of the spacers 48 to move the lock head 40 to a horizontally extending position by a door handle 50 which is suitably pivoted at 51 to the inside structure of the door 13 and which has an arm 52 to which a wire link 53 is pivotally attached, the other end of the link being pivotally attached to the outer end of the arm 45. By depressing the handle 50, the operator can rotate the bolt 16 against the torsion action of the spring 44 to unlatch the door, as is explained hereinafter. The door handle 50 can be operated and locked in a conventional manner, a lost motion connection means, not shown, could be employed to prevent actuation of the handle by the bolt when the bolt is moved into the catch, as is described hereinafter.

Preferably, washer 55 is positioned on the bolt 16 between the arm 45 and a plate 33, and a flanged spacer collar 56 is likewise interposed between the arm 45 and the plate 36.

The catch 17 comprises a base plate 60 which is suitably secured to the inside of a vertical wall 61 of the frame member 12 and a body 62 and cover plate 63 are attached to the outer face thereof by suitable means, such as bolts, not shown. The body 62 is sandwiched between the plates 60, 63 and has a cylindrical opening 64 in which a drum shaped keeper member 65 is rotatably positioned. The body 62 has an elongated portion 67 extending horizontally and the edge 70 thereof forms a guide surface for the lock head 40 of the bolt, as is explained hereinafter, and the corner 71 of the body is curved to facilitate guiding of the bolt section. A slot 72 is formed in the body 62 one side of which is an extension of the edge 70. The keeper member 65 has a groove 73, which is rectangular in transverse section, and extends diametrically thereof and is the same width as the slot 72. When the keeper member 65 is rotated to the position shown in FIG. 2, referred to hereinafter as the open position, the sides of the groove 73 register with the sides of the slot 72.

The keeper member 65 is yieldingly held in the open position by a detent comprising a ball 74 movable in a cylindrical opening 75 in the end of the body 62 and axially aligned with slot 72. The opening 75 and the ball 74 are of greater diameter than the slot 72 and the groove 73 in the keeper member 65 and a flat spring 76, secured at one end to the body 62 by a screw 77, urges the ball 74 partially into the end of the groove 73 when the keeper member 65 is turned to the position shown in FIG. 2 to cooperate with the edges of the groove to position the keeper member.

Figures 5, 6:
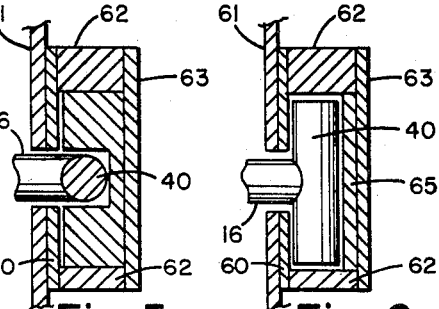
FIG. 5 is a sectional view taken substantially along line 5—5 of FIG. 2.
FIG. 6 is a view taken substantially along line 6—6 of FIG. 3.
Figure 7:
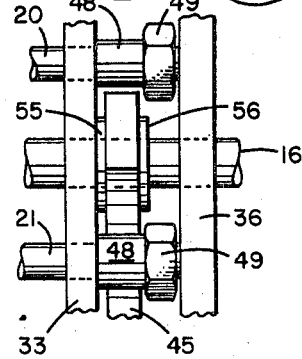
FIG. 7 is a fragmentary side view of the bolt structure of the latching mechanism shown in FIG. 1.
Figure 2:
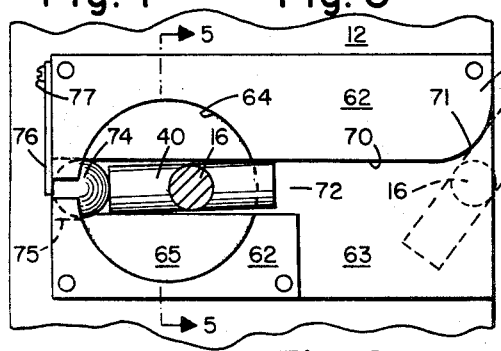
FIGS. 2 and 3 are sectional piews taken substantially along line 2—2 of FIG. 1 and showing certain parts of the door latching mechanism in different positions.
Figure 3:
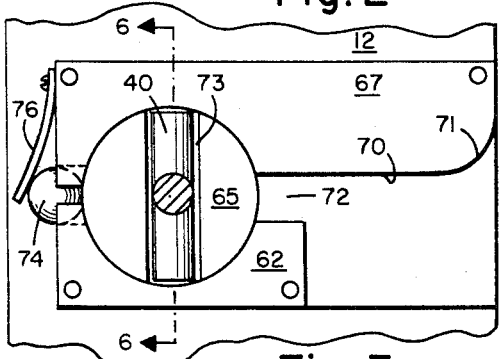

The door frame wall member 61 has a slot 80 which extends from slightly beyond the center of the keeper member 65 to the outer edge of the door frame so that when the door 13 is swung to a closed position, the outer end of the bolt 16 enters the slot 80 and the upwardly projecting head 40 thereof engages the curved edge 71 of the body 62 which causes the head to be turned to a horizontal position as it moves with the door to the closed position of the door, as is illustrated in FIG. 2. The lock head 40 of the bolt 16 enters the groove 73 of keeper 65 and its leading end displaces the ball 74 from the groove when the head is entirely within the groove, whereupon the keeper 65 is released from the holding affect of the ball and is rotated by the counterclockwise rotational effort applied to the bolt by the spring 44. The keeper 65 is rotated to the position shown in FIGS. 1, 3 and 6 and it will be seen that the head 40 is substantially completely surrounded by abutment means which confines it against forces occurring by a tendency of the door to open and by a tendency of the door and door frame to separate. The side of the groove 73 form abutments extending parallel to the side of the door 13 and the plate 60 and wall 61 provide abutment means in a plane extending transversely of the door.

When the bolt 16 is rotated by operation of the handle 50, the keeper 65 is rotated by the section 40 to the position shown in FIG. 2 with the groove 73 aligned with the slot 72 whereby the lock head 40 of the bolt is free to move from the catch as the door is swung towards its open position.

It will be seen that in the event the frame member 11 or 12 are separated by the impact of a collision or the like, the members 30, 40 are firmly anchored to the respective frame members and that the bolt 16 can be extended from the door, if sufficient force is applied thereto, without separating from its support structure. In fact, considerable force of the impact will be absorbed by the resistance offered to outward movement of the bolt by the arm 45 which is secured to the bolt by the set screw 46 and the washer 56. The extension of the bolt from the door is further resisted by the compression of spring 44 so that the parts of the bolt structure, including bolt 16, will not be subjected to shocks which might rupture the parts. Similarly, should the frame member 11 and the left hand side of the door 13 become separated, the rods 20, 21 will extend from the door because the plate 22 is not secured to the door edge but is merely held thereto by the force of spring 44 acting on the plate through the rods and the nuts 23, 24. Thus, the door 13 will be prevented from swinging open by the bolt structure 15 although considerable gap may occur between the door and either of the frame members 11, 12.

Although but one form of the invention has been shown, it is to be understood that other forms, modifications and adaptations thereof may be made, all falling within the scope of the claims which follow.

I claim:

1. In a door structure comprising two spaced generally parallel door frame members forming sides of a doorway, a door movable into and out of substantial alignment with said frame members to close and open said doorway respectively and having opposite side edges extending along said frame members respectively, a bolt structure carried by said door and having one end extending from one of said side edges and adapted to be engaged by catch means on the frame member adjacent said one side, catch means on the last mentioned frame member and comprising abutment means facing away from said one side edge of said door, said bolt having abutment means facing the first mentioned abutment means when said door is closing said doorway for retaining said bolt, and means for extending said bolt from said bolt structure appreciably beyond the normal extension thereof while said abutment means are engaged, characterized by said bolt structure comprising two spaced rods and a rod-like bolt disposed between said rods, spacer plates on said rods and forming guide means for longitudinal and axial rotational movements of said bolt, said one end of said bolt having a laterally projecting head, said catch comprising a rotatable member having spaced walls to receive said head therebetween, means for rotatably supporting said rotatable member for rotation about an axis coinciding with the axis of said bolt when the door is in its closed position in said doorway, and abutment means adapted to retain said head between said spaced walls of said rotatable member.

2. In a door structure as defined in claim 1 further characterized by means to limit axial rotation of said bolt between two positions, and resilient means to urge said bolt to one of said positions.

3. In a door structure as defined in claim 1 further characterized by a coil spring formed about said bolt and disposed between said spacer plates.

4. In a door structure as defined in claim 3 further characterized by an arm extending laterally from said bolt, said coil spring engaging said arm for urging said bolt about the longitudinal axis thereof.

5. In a door structure as defined in claim 1 characterized by means operative to retain and release said rotatable member in a given position for receiving said head, the last mentioned means being operated by movement of said head into receiving engagement with said rotatable member to release said member for rotation, means to rotate said member to a second given position, and abutment means adapted to extend in a plane spanning said walls of said member to retain said head between said walls when said rotatable member is moved to said second given position and to be out of registration with said walls when said rotatable member is in said given position.

6. In a door structure comprising two spaced generally parallel door frame members forming sides of a doorway, a door movable into and out of substantial alignment with said frame members to close and open said doorway respectively and having opposite side edges extending along said frame members respectively, a bolt structure carried by said door and having one end extending from one of said side edges and adapted to be engaged by catch means on the frame member adjacent said one side, catch means on the last mentioned frame member and comprising abutment means facing away from said one side edge of said door, said bolt having abutment means facing the first mentioned abutment means when said door is closing said doorway for retaining said bolt, means for extending said bolt from said bolt structure appreciably beyond the normal extension thereof while said abutment means are engaged, said bolt structure including a holding member extending beyond the other side edge of said door, and hinge means for said door comprising means for anchoring said holding member to the other of said door frames.

7. A door structure comprising a door frame defining a doorway, a door for closing said doorway, means to support said door for lateral movement relative to said doorway whereby said door is moved into and out of said doorway, said door and frame having side members adapted to extend alongside one another when said door is in said doorway, one of said side members having an elongated lock bolt projecting therefrom and adapted to engage catch means on the other of said side members, means for supporting said bolt for rotation about its axis, the outer end of said bolt having laterally extending shoulder means forming a projecting abutment, catch means on the other of said side members and comprising abutment means at one side of the axis of said bolt and adapted to face said projecting abutment when said door is in said doorway and said bolt is rotated to a given position, said bolt being rotatable about its axis to shift said projecting abutment into and out of alignment with said abutment means and means actuated by movement of said door relative to said door frame to rotate said bolt about its axis and move said projecting abutment from a position non-aligned with said abutment means into alignment with said abutment means by movement of said door into said doorway whereby said abutment means resists separation of said door and frame side members.

8. A door structure as defined in claim 7 in which the last recited means comprises a spring normally urging said bolt in a direction about its axis to a position in which said projecting abutment is in alignment with said abutment means, and cam means for rotating said bolt in the opposite direction about its axis to move said projecting abutment out of alignment with said abutment means as said door approaches its doorway closing position.

9. A door structure as defined in claim 7 including manually actuated means for rotating said bolt about its axis in said opposite direction for moving said projecting abutment out of alignment with said abutment means for permitting removal of said door from said doorway.

10. A door structure as defined in claim 7 in which said abutment means includes a rotatable member having an aperture defined by two spaced opposed walls adapted to extend generally parallel to the direction of movement of said door to receive said outer end of said bolt and said projecting abutment therebetween when said door is moved into said doorway and to rotate with said bolt to a position in which at least one of said side walls are positioned normal to the direction of movement of said door from said doorway.

11. A door structure as defined in claim 10 in which said shoulder means on said bolt comprises abutment members extending from opposite sides of said bolt and adapted to extend along one of said walls of said rotatable member to prevent removal of said door from said doorway when said rotatable member is in a position in which said walls extend normal to the direction of movement of the door from said doorway.

12. A door structure as defined in claim 11 further characterized by means urging said bolt about its axis to a position in which said abutment members extend generally normal to the direction of movement of said door from said doorway, and cam means on said door frame for engaging with one of said abutment members for rotating said bolt about its axis to position said abutment members in a plane extending generally parallel to the direction of movement of said door.

13. A door structure as defined in claim 12 further characterized by means for restraining movement of said rotatable member from a position in which said walls extend generally parallel to the movement of said door for receiving said shoulder means therebetween, and means responsive to the positioning of said shoulder means between said walls for releasing said rotatable member for rotation with said bolt.

14. A door structure as defined in claim 10 further characterized by said abutment means additionally comprising an abutment element extending generally normally to the plane of said one side wall and between said one side member of said door and said rotatable member and adapted to confront said abutment member when said abutment member is moved to said position generally normal to the direction of movement of said door to resist movement of said bolt in an axial direction away from between said walls of said rotatable member.

15. A lock for a door supported for movement laterally into and out of alignment with a side of a doorway frame adjacent one edge of said door, said lock comprising a bolt extending from said one edge of said door, said bolt having laterally projecting shoulders extending from opposite sides of the outer end thereof, means for supporting said bolt on said door for rotation about the axis of said bolt and for continually urging said bolt about its axis to a position in which said shoulders extend generally normal to the direction of movement of said door relative to said door frame, lock means on said frame comprising abutment means adapted to register with said shoulders of said bolt and resist movement of said door relative to said frame, said lock means including a rotatable member having spaced opposed side walls adapted to receive said laterally projecting shoulders therebetween when said rotatable member is in one angular position and said door is moved into said doorway and rotatable by said bolt to a second position in which said side walls extend generally normal to the direction of said movement of said door, and means to rotate said member and bolt to a position in which said side walls and shoulders extend in a direction generally parallel to movement of said door.

16. A lock as set forth in claim 15 further characterized by wall means interposed between at least one of said shoulders and said door to engage said shoulder and resist movement of said bolt axially from said rotatable member.

17. A lock as set forth in claim 15 including detent means to lock said rotatable member in a position in which said walls extend generally in the direction of movement of said door, and means for releasing said rotatable member for rotation by said bolt when said shoulders are moved into position between said walls.

18. A door structure comprising a frame defining a doorway, a door pivoted to said frame at a first side of said doorway and adapted to be swung to and from a position in said doorway for opening and closing said doorway, means to secure said door in said doorway comprising an elongated bolt carried by said door and adapted to project from one edge thereof and engage a lock device on said frame at a second side of said doorway opposite said first side, an elongated guide member extending across said door from adjacent said first side of said doorway towards said second side of said doorway, means attaching said bolt to said guide member and yieldingly permitting axial movement of said bolt outwardly from said door, and means to attach the end of said guide member adjacent said first side of said doorway to said frame whereby said guide member is anchored to said frame.

19. A door structure as defined in claim 18 further characterized by said lock device and bolt cooperating to lock said bolt against axial movement thereof relative to said lock device.

20. A door structure as defined in claim 19 further characterized by said bolt being axially rotatable for locking and unlocking action with said lock device and said means for attaching said bolt to said guide means comprising a coil spring adapted to resist axial movement of said bolt and to impart a rotational force on said bolt urging it to rotate about its axis.

References Cited

UNITED STATES PATENTS

| | | | |
|---|---|---|---|
| 2,216,367 | 10/1940 | Hoblick | 49—394 X |
| 2,772,110 | 11/1956 | Petrochko | 292—341.17 |
| 2,893,774 | 7/1959 | Carpenter | 49—394 X |
| 3,066,964 | 12/1962 | Lemaire | 292—4.376 |
| 3,298,728 | 1/1967 | Dye | 292—58 |

KENNETH DOWNEY, *Primary Examiner.*